US009633020B2

(12) United States Patent
Lin

(10) Patent No.: US 9,633,020 B2
(45) Date of Patent: Apr. 25, 2017

(54) METHOD AND DEVICE FOR PLAYING MEDIA SYNCHRONOUSLY

(71) Applicant: Tencent Technology (Shenzhen) Company Limited, Shenzhen (CN)

(72) Inventor: Xiaodan Lin, Guangdong (CN)

(73) Assignee: TENCENT TECHNOLOGY (SHENZHEN) COMPANY LIMITED, Shenzhen, Guangdong (CN)

(*) Notice: Subject to any disclaimer, the term of this patent is extended or adjusted under 35 U.S.C. 154(b) by 272 days.

(21) Appl. No.: 14/193,618

(22) Filed: Feb. 28, 2014

(65) Prior Publication Data

US 2014/0359470 A1 Dec. 4, 2014

Related U.S. Application Data

(63) Continuation of application No. PCT/CN2013/089095, filed on Dec. 11, 2013.

(30) Foreign Application Priority Data

May 27, 2013 (CN) .......................... 2013 1 0201769

(51) Int. Cl.
*G06F 3/0484* (2013.01)
*G06F 3/0482* (2013.01)
(Continued)

(52) U.S. Cl.
CPC .... *G06F 17/30053* (2013.01); *G06F 17/3038* (2013.01); *H04L 65/4084* (2013.01);
(Continued)

(58) Field of Classification Search
CPC ................. G06F 3/0484; G06F 3/0482; G06F 17/30772; G06F 17/3038; G06F 17/30053;
(Continued)

(56) References Cited

U.S. PATENT DOCUMENTS 8,026,805 B1* 9/2011 Rowe .......................... 340/539.1
2009/0106357 A1* 4/2009 Igelman et al. ............... 709/203
(Continued)

FOREIGN PATENT DOCUMENTS

| CN | 101741841 A | 6/2010 |
|---|---|---|
| CN | 101964787 A | 2/2011 |

(Continued)

OTHER PUBLICATIONS

International Search Report and Written Opinion dated Mar. 20, 2014 for corresponding International Patent Application No. PCT/CN2013/089095, 9 pages.

*Primary Examiner* — Ting Lee
(74) *Attorney, Agent, or Firm* — Brinks Gilson & Lione

(57) ABSTRACT

The present disclosure provides a method and terminal device for playing media synchronously. The method comprises: triggering a function of playing media synchronously, acquiring a preset identification (ID) corresponding to an end user, obtaining a media history playlist including a history of an address and a play location of a media file that is listened or viewed by the end user corresponding to the end user according to the preset ID, and resuming the media file that is chosen by the end user according to the media history playlist.

17 Claims, 7 Drawing Sheets

(51) Int. Cl.
    *G06F 17/30*     (2006.01)
    *H04N 21/00*     (2011.01)
    *H04L 29/06*     (2006.01)

(52) U.S. Cl.
    CPC ........... *H04N 21/00* (2013.01); *G06F 3/0482* (2013.01); *G06F 3/0484* (2013.01); *G06F 17/30772* (2013.01)

(58) Field of Classification Search
    CPC .............. H04N 21/47217; H04N 21/00; H04L 65/4084
    See application file for complete search history.

(56) References Cited

U.S. PATENT DOCUMENTS

| | | | |
|---|---|---|---|
| 2009/0157842 A1* | 6/2009 | Shaffer et al. | 709/217 |
| 2010/0250669 A1* | 9/2010 | Pan | 709/203 |
| 2013/0086003 A1* | 4/2013 | Alsina | G06F 17/30578 707/690 |
| 2013/0238730 A1* | 9/2013 | Nir et al. | 709/206 |
| 2014/0108929 A1* | 4/2014 | Garmark et al. | 715/716 |
| 2014/0280587 A1* | 9/2014 | Sharma et al. | 709/204 |

FOREIGN PATENT DOCUMENTS

| | | | |
|---|---|---|---|
| CN | 102523529 A | 6/2012 | |
| CN | 102724196 A | 10/2012 | |

* cited by examiner

METHOD AND DEVICE FOR PLAYING MEDIA SYNCHRONOUSLY

CROSS-REFERENCE TO RELATED APPLICATIONS

This application is a continuation of International Application No. PCT/CN2013/089095, filed on Dec. 11, 2013, which claims priority to Chinese Patent Application No. 201310201769.5, filed on May 27, 2013, both of which are hereby incorporated herein by reference in their entireties.

FIELD OF THE TECHNOLOGY

The present disclosure relates to Internet technology, especially relates to a method and device for playing media such as audio or video.

BACKGROUND

With the development of portable terminals, more and more users prefer to play audio or video on mobile phone or tablet device. Due to that portable terminals are compact and easy to carry, so users can watch videos anytime in a bus or outdoor, thus enriching users' leisure lives.

SUMMARY

The present disclosure provides a method and device for playing media synchronously. The method comprises: triggering, by a device having at least one processor, a function of playing media synchronously; acquiring, by the device, a preset identification (ID) corresponding to an end user; obtaining, by the device, a media history playlist corresponding to the end user according to the preset ID, which the media history playlist comprises a history of an address and a play location of a media file that is listened or viewed by the end user; and resuming, by the device, the playing of the media file that is chosen by the end user according to the media history playlist.

The present disclosure also provides a device playing media. The device includes: one or more processors and memory, a synchronous triggering module stored in the memory and to be executed by the one or more processors for triggering a function of playing media synchronously and acquiring a preset ID corresponding to an end user, a querying module stored in the memory and to be executed by the one or more processors for obtaining an media history playlist corresponding to the end user according to the preset ID, which media history playlist includes a history of an address and a play location of an media file that is listened or viewed by the end user, and a playing module stored in the memory and to be executed by the one or more processors for resuming the media file that is chosen by the end user according to the media history playlist.

BRIEF DESCRIPTION OF THE DRAWINGS

The terminal device and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified. The drawings are for illustrative purposes only. One with ordinary skilled in the art may create variations of drawings.

DETAILED DESCRIPTION

Figure 1:
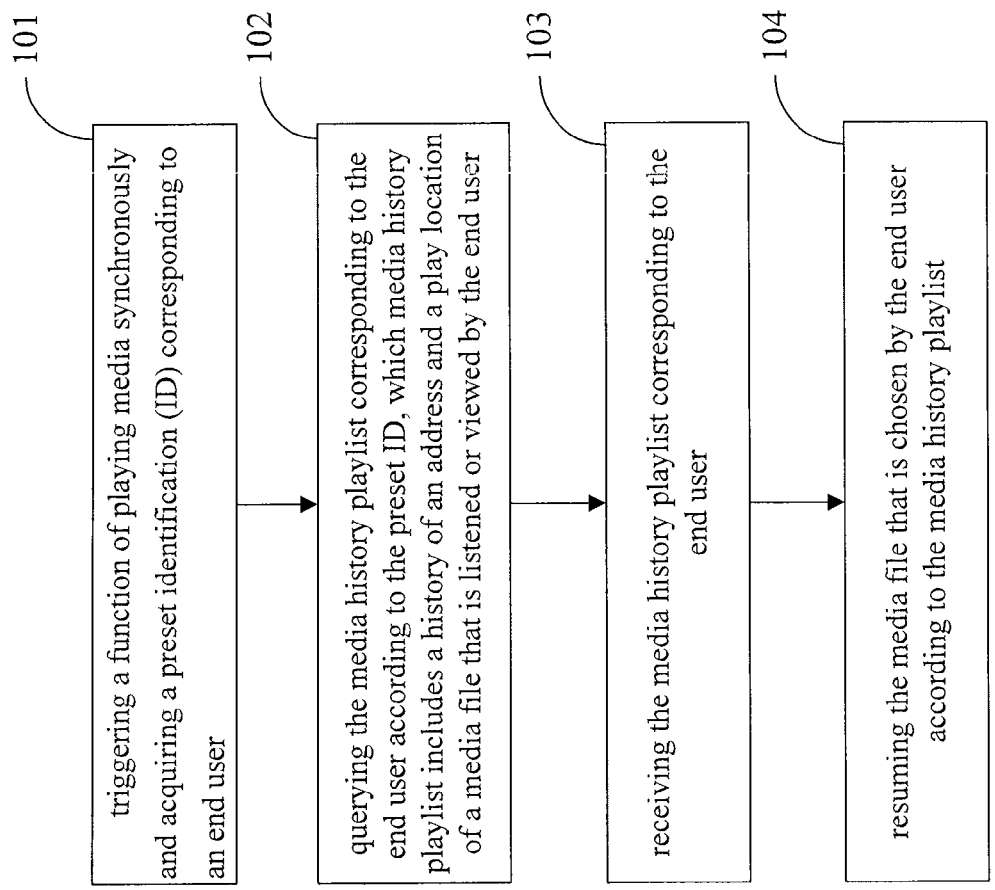
FIG. 1 is a flow diagram of the method for playing media synchronously.

The principles described herein may be embodied in many different forms. Not all of the depicted components may be required, however, and some implementations may include additional components. Variations in the arrangement and type of the components may be made without departing from the spirit or scope of the claims as set forth herein. Additional, different or fewer components may be provided.

Reference throughout this specification to "one embodiment," "an embodiment," "example embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an example embodiment," or the like in the singular or plural in various places throughout this specification are not necessarily all referring to the same embodiment. Furthermore, the particular features, structures, or characteristics may be combined in any suitable manner in one or more embodiments.

The terminology used in the description of the invention herein is for the purpose of describing particular examples only and is not intended to be limiting of the invention. As used in the description of the invention and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The exemplary environment may include a server, a client, and a communication network. The server and the client may be coupled through the communication network for information exchange, such as sending/receiving identification information, sending/receiving data files such as splash screen images, etc. Although only one client and one server are shown in the environment, any number of terminals or servers may be included, and other devices may also be included.

The communication network may include any appropriate type of communication network for providing network connections to the server and client or among multiple servers or clients. For example, communication network may include the Internet or other types of computer networks or telecommunication networks, either wired or wireless. In a certain embodiment, the disclosed methods and apparatus may be implemented, for example, in a wireless network that includes at least one client.

In some cases, the client may refer to any appropriate user terminal with certain computing capabilities, such as a personal computer (PC), a work station computer, a server computer, a hand-held computing device (tablet), a smart phone or mobile phone, or any other user-side computing device. In various embodiments, the client may include a network access device. The client can be stationary or mobile.

A server, as used herein, may refer to one or more server computers configured to provide certain server functionalities, such as database management and search engines. A server may also include one or more processors to execute computer programs in parallel.

In most cases, users play media such as audio or video files in scattered time, and may exit playing anytime; furthermore, users may watch the same video on different platforms due to the diversification of intelligent terminals, e.g. the user watches video on mobile phone in a bus, but he/she want to continue watching the same video on PC when he/she gets home; so how to save the user's current playing progress and enable the user to watch the same video on different platforms is a problem that needs to solve.

In order to solve the problem of resuming the media such as audio or video from the breakpoint across terminals, the embodiments of the present disclosure provide a method and a terminal device for playing media such as audio or video synchronously.

The terminals in the present embodiments may includes but not limited to mobile phones, tablets, eBook readers, MP3 (Moving Picture Experts Group Audio Layer III) players, MP4 (Moving Picture Experts Group Audio Layer IV) players, laptops, PC (Personal Computer) and other devices. The embodiments shall not specifically limit the above mentioned terminals. All audio or video may be considered media. Server side or service sides refer to server. A server may be a hardware with one or more processors and memory.

As shown in FIG. 1, the embodiment provides a method for playing media such as audio or video synchronously, which comprises:

101: triggering a function of playing media synchronously and acquiring a preset identification (ID) corresponding to an end user;

102: querying the media history playlist corresponding to the end user according to the preset ID, which media history playlist includes a history of an address and a play location of a media file that is listened or viewed by the end user;

103: receiving the media history playlist corresponding to the end user

104: resuming the media file that is chosen by the end user according to the media history playlist The step of resuming the audio or video file chosen by the end user according to historical play location information corresponding to each audio or video file in the audio or video history playlist may further comprise:

Receiving the media history playlist according to the end user from a sever;

Accessing a local current media playlist;

Synchronizing the local current audio or video playlist according to the audio or video history playlist corresponding to the end user from the server;

The step of synchronizing the local current audio or video playlist according to the audio or video history playlist corresponding to the end user from the server may further comprise:

Matching the local current media playlist with the media history playlist corresponding to the end user from the server;

Merging the media file according to the local current media playlist when the media history playlist corresponding to the end user from the server does not match the local current media playlist;

Merging the local current media playlist with the media history playlist when the local current media playlist does not match the media history playlist corresponding to the end user from the server; and uploading the merged media history playlist to the server wherein the server stores the merged media history playlist corresponding to the preset ID.

The step of querying and receiving the media history playlist corresponding to the end user according to the preset ID, which media history playlist includes a history of an address and a play location of a media file that is listened or viewed by the end user may further comprise:

Receiving a command for saving playing information for the audio and video file wherein the play information includes the address and the play location of the of the media file.

Saving the play information to the media history playlist.

After the step of synchronizing the local current audio or video playlist according to the audio or video history playlist corresponding to the end user from the server, the method also comprises:

Determining whether the local current media playlist comprises a modification operation for the media file, and synchronizing the modification operation to the media history playlist in the server if the local current media playlist comprises the modification operation.

After the step of synchronizing the local current audio or video playlist according to the audio or video history playlist corresponding to the end user from the server, the method may also comprise:

Receiving a synchronous update command from the server wherein the synchronous update command comprises an amount of change to the media history playlist in the server; and Updating the local current media playlist according to the synchronous update command.

Before the step of obtaining a media history playlist corresponding to the end user according to the preset ID, wherein the media history playlist comprises a history of an address and a play location of a media file that is listened or viewed by the end user, the method may comprise:

Detecting whether a history record of the preset ID exists on the server; if the history record of the preset ID exists, querying the media history playlist corresponding to the end user in the server according to the preset ID; if the history record of the preset ID does not exist, uploading the local current media playlist into the server.

The media history playlist in the method may also include the name and/or thumbnail of the historical audio or video file.

The preset ID includes but not limited to International Mobile Station Equipment Identity (IMEI) No. of the terminal or the account number for the end user to login the default application.

The beneficial effects of the present embodiment comprises: triggering a function of playing media synchronously, acquiring a preset identification (ID) corresponding to an end user, obtaining a media history playlist including a history of an address and a play location of a media file that is listened or viewed by the end user corresponding to the end user according to the preset ID, and resuming the media file that is chosen by the end user according to the media history playlist.

The problem of resuming the audio or video from the breakpoint across terminals may be solved by adopting the technical scheme in the present disclosure which is described as follow: storing the user's audio or video history playlist corresponding to the preset ID on the server side, and accessing the audio or video history playlist which belongs to the user corresponding to the preset ID according to the preset ID, then the user may choose the video file to resume in the audio or video history playlist.

Figure 2A:
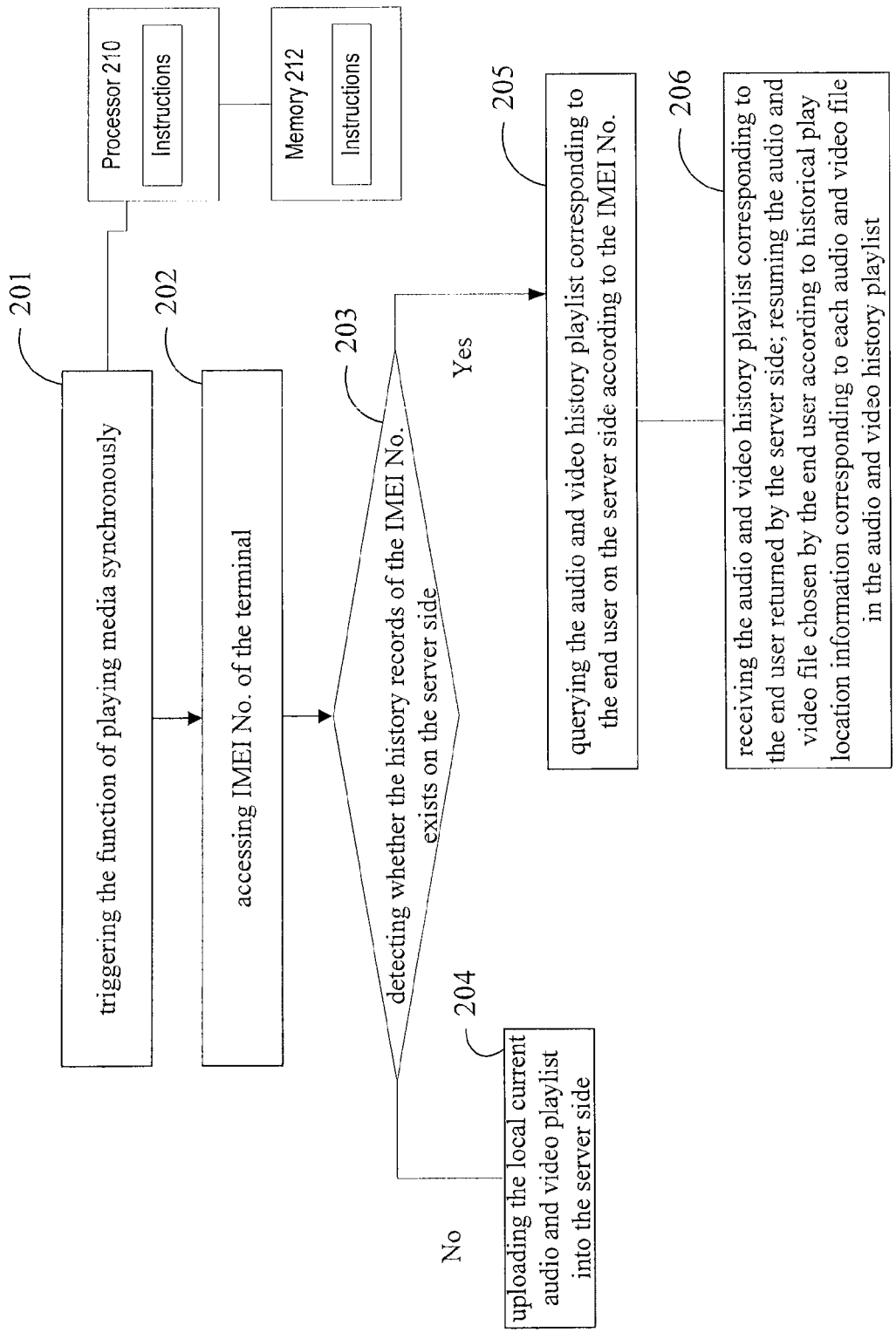
FIG. 2a is a flow diagram of the method for playing media synchronously by accessing International Mobile Station Equipment Identity (IMEI) No. of the terminal.

The embodiments of the present disclosure provide a method for playing audio or video synchronously, the preset ID of the present embodiment will be described by taking IMEI No. of mobile phone as example. As shown in FIG. 2a, the process of the method comprises:

201: triggering the function of playing media such as audio or video synchronously.

In this step, the audio or video playlist's function of synchronizing playing is added into browsers or audio or video client software; users may choose whether to synchronize or not based on their personal needs. In the specific execution process, the triggering mode of the function of synchronizing playing includes but not limited to any of the following forms: (1) set the "Synchronization" option in the interface of browsers or audio or video client software, when users need synchronization, they can click this option to trigger synchronous operation. (2) Trigger synchronous operation and save the current audio or video playlist when browsers or audio or video client software shutdown abnormally. (3) Pop up prompt interface prompting users whether to execute synchronous operation or not, and execute synchronization based on users' choice when browsers or audio or video client software shutdown properly.

In this embodiment, the media such as audio or video playlist save correspondingly the link address and the play location of the audio or video file, wherein the play location means the play time breakpoint location of the played historical audio or video file on browsers or audio or video client software. Wherein, the play location may be displayed in the form of progress bar or recorded by time, which shall not be specifically limited by the embodiment. For example, a TV show plays to the 15$^{th}$ minute, and then the 15$^{th}$ minute is the play location of this video file.

Optionally, the name and/or thumbnail of the audio or video file may also be saved in the audio or video playlist, so that end users can be more intuitive to learn the audio or video files in the audio or video playlist.

202: accessing IMEI No. of the terminal.

In this step, synchronize the audio or video playlist based on IMEI No. of the terminal after triggering the synchronous function. Preferably, accessing IMEI No. of the terminal, this step comprises: receiving IMEI No. entered by users, or reading IMEI No. stored in advance by software, which shall not be specifically limited by the embodiment.

203: detecting whether the history records of the IMEI No. exists on the server side, if yes, then execute step 205; if no, then execute step 204.

Preferably in this embodiment, detecting whether the history records of the IMEI No. exists on the server side, this step comprises: sending the IMEI No. to the server side, the server side query whether there are access records of the IMEI on the server side, if yes, then inform the terminal this access is the first access; if no, then inform the terminal this access is not the first access.

It is worthy of note that in the specific execution process, step 203 is optional, step 205 can be directly executed without detecting IMEI No., which shall not be specifically limited by the embodiment.

204: uploading the local current audio or video playlist into the server side.

In this step, the local audio or video playlist of the terminal may be created on browsers or audio or video client software, learning that this access is the first access after receiving the notification returned by the server side; then execute initialization operation, i.e. upload the local current audio or video playlist of the terminal into the server side.

It is worthy of note that in the embodiment, the option for saving audio or video information can be added on browsers or audio or video client software; access the audio or video play information browsed by the current user and save the play information correspondingly into the local audio or video playlist when the user triggers this option. The specific execution process comprises: receiving the save command for audio or video and accessing the play information of the current audio or video, wherein the play information includes the address and the current play location of the current audio or video file; saving the play information of the current audio or video into the local current audio or video playlist correspondingly. For example, the user needs to pause when the TV show plays to the 15$^{th}$ minute, then he/she can click the option for saving audio or video information, the background access the link address and current play location (15$^{th}$ minute) of the video file, and save them into the local current audio or video playlist. If the information of the video file is already in the local current audio or video playlist, then update the information of the playlist with newly acquired play information.

Figure 2B:
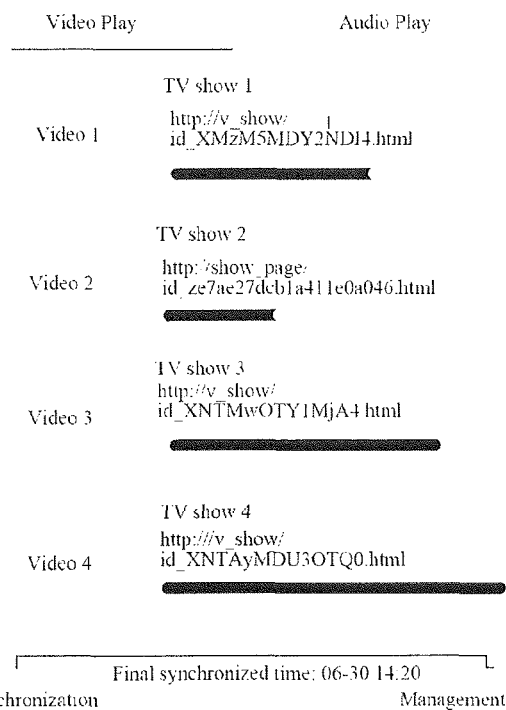
FIG. 2b is an interface schematic diagram of the audio or video playlist.
Figure 2C:
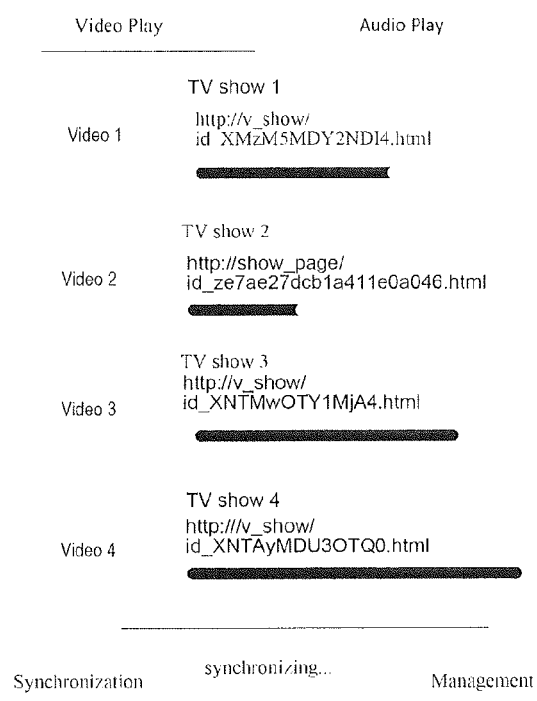
FIG. 2c is an interface schematic diagram of synchronizing the audio or video playlist.

Preferably, as shown in FIG. 2b, the schematic diagram of the audio or video playlist stored locally at the terminal comprises: the name, thumbnail, link address and progress bar of play of the audio or video file; audio or video files are sorted by the update time, wherein "Synchronization" option can be set in the interface of the audio or video playlist; the interface can also set "Management" option which can be configured to execute modification operations on the audio or video files in the audio or video playlist, e.g. when users finish watching a video, he/she can delete the video or modify the file name etc. Preferably, set the synchronous progress bar in the interface of the audio or video playlist, as shown in FIG. 2c, when synchronizing the audio or video playlist, the synchronous progress bar in the interface of the audio or video playlist display "synchronizing"; when synchronization is finished, as shown in FIG. 2b, the latest synchronization time will be displayed at the synchronous progress bar.

205: querying the audio or video history playlist corresponding to the end user on the server side according to the IMEI No.

Preferably in this step, querying the audio or video history playlist corresponding to the end user on the server side according to the IMEI No., the step comprises: sending IMEI No. to the server side, the server side queries the audio or video history playlist of the end user corresponding to the IMEI No. and feed back the query results to the terminal. Wherein, the audio or video history playlist of the end user saved on the server side may be uploaded by this terminal, or may be uploaded by other terminal, which shall not be specifically limited by the embodiment.

206: receiving the audio or video history playlist corresponding to the end user returned by the server side; resuming the audio or video file chosen by the end user according to historical play location information corresponding to each audio or video file in the audio or video history playlist.

Preferably in this step, resuming the audio or video file chosen by the end user according to historical play location information corresponding to each audio or video file in the audio or video history playlist, this step comprises: accessing the local current audio or video playlist; synchronizing the local current audio or video playlist according to the audio or video history playlist corresponding to the end user; resuming the audio or video file chosen by the end user according to historical play location information corresponding to each audio or video file in the synchronized audio or video playlist.

In this embodiment, after the user choose the function of playing audio or video synchronously, the terminal browsers or audio or video client software will pull the audio or video playlist corresponding to the IMEI No. stored on the server side according to the IMEI No.; if the audio or video playlist of the user are stored locally at the terminal, then synchronize the playlist with the local playlist, so that the user can choose favorite audio or video file in the synchronized audio or video playlist to resume. If the audio or video playlist of the user is not stored on the server side yet, then after pulling the audio or video playlist on the server side, the user can directly choose favorite audio or video file from the pulled audio or video playlist to resume.

Alternatively, the use may pull the audio or video playlist corresponding to the IMEI No. stored on the terminal device according to the IMEI No.; the audio or video playlist of the user are stored locally at the terminal, then synchronize the playlist with the local playlist, so that the user can choose favorite audio or video file in the synchronized audio or video playlist to resume.

Preferably, synchronizing the local current audio or video playlist according to the audio or video history playlist corresponding to the end user, the step comprises:

Matching the local current audio or video playlist with the audio or video history playlist corresponding to the end user;

Merging the different audio or video file in the audio or video history playlist with the local current audio or video playlist when some information in the audio or video history playlist corresponding to the end user does not match the local current audio or video playlist;

Merging the different audio or video file in the local current audio or video playlist with the audio or video history playlist when some information in the local current audio or video playlist does not match the audio or video history playlist corresponding to the end user; and uploading the synchronized audio or video playlist into the server side, wherein the preset ID corresponding to the server side stores the synchronized audio or video playlist.

The information being matched includes but not limited to: the name, thumbnail, link address and play progress of the audio or video file etc.; matching these information one by one during the process of matching, if the information that doesn't match is found, then execute synchronous update. If some information in the local current audio or video playlist of the terminal is different from the information in the received audio or video playlist returned by the server, it indicates that there are new watch information on browsers or audio or video client software for the user, then by this time update synchronously the new watch information into the server side; if some information in the received audio or video playlist returned by the server is different from the information in the local current audio or video playlist of the terminal, then update the local audio or video playlist, so that users can choose to watch.

Due to that the historical play location of the video file is recorded in the audio or video playlist, so when the user choose one audio or video file that is already watched to play, the file will pull the video stream and fast forward to the historical play location according to the historical play location, so as to make the user browse the same audio or video file across different terminals.

It is worthy of note that if step 203 is not executed in this embodiment, then execute step 205 directly; and if the audio or video history playlist of the end user returned by the server side is not received, it indicates that the IMEI is not recorded on the server side, then execute step 204, which need not to be repeated here.

It is worthy of note that after the terminal function of playing audio or video synchronously is initiated in this embodiment, and after users modify the local audio or video playlist, e.g. execute delete, add or edit operations on the local audio or video playlist, then synchronize the modified audio or video playlist into the server side. Optionally, long connection between the server side and the terminal may also be created, e.g. a long connection between the server and the terminal may be created through Heartbeat Packet mechanism or PUSH mechanism, so that the updated part will be automatically synchronized to the local when the audio or video playlist on the server side updates.

So optionally, after synchronizing the local current audio or video playlist according to the audio or video history playlist corresponding to the end user, the step also comprises: determining whether the local current audio or video playlist includes the modification operations on each audio or video file, if yes, synchronize the modification operations into the audio or video playlist corresponding to the server side.

Optionally, after synchronizing the local current audio or video playlist according to the audio or video history playlist corresponding to the end user, the step also comprises: receiving the synchronous update command sent by the server side which includes variation of the audio or video playlist corresponding to the server side; updating the local current audio or video playlist according to the synchronous update command.

The beneficial effects of the present embodiment comprises: triggering the function of playing audio or video synchronously, and accessing the preset ID corresponding to the end user; querying the audio or video history playlist corresponding to the end user on the server side according to the preset ID, wherein the audio or video history playlist includes the link address and historical play location of the historical audio or video file; resuming the audio or video file chosen by the end user according to historical play location information corresponding to each audio or video file in the audio or video history playlist.

It is worthy of note that there may not be a need to get historical audio or video file from the server, all information needed for resuming the play may be stored on the terminal device associated with IMEI no. If that's the case, no need to send and query such information from the server side.

The problem of resuming the audio or video from the breakpoint across terminals can be solved by adopting the technical scheme in the present embodiment which is described as follow: storing the user's audio or video history playlist corresponding to the preset ID on the server side, and accessing the audio or video history playlist which belongs to the user corresponding to the preset ID according to the preset ID, then the user can choose the video file to resume in the audio or video history playlist. And because each mobile phone client has a unique IMEI No., so that when reinstalling the local system and software, the user can recover his/her audio or video playlist from network based on the IMEI No. to his/her mobile phone.

Figure 3:
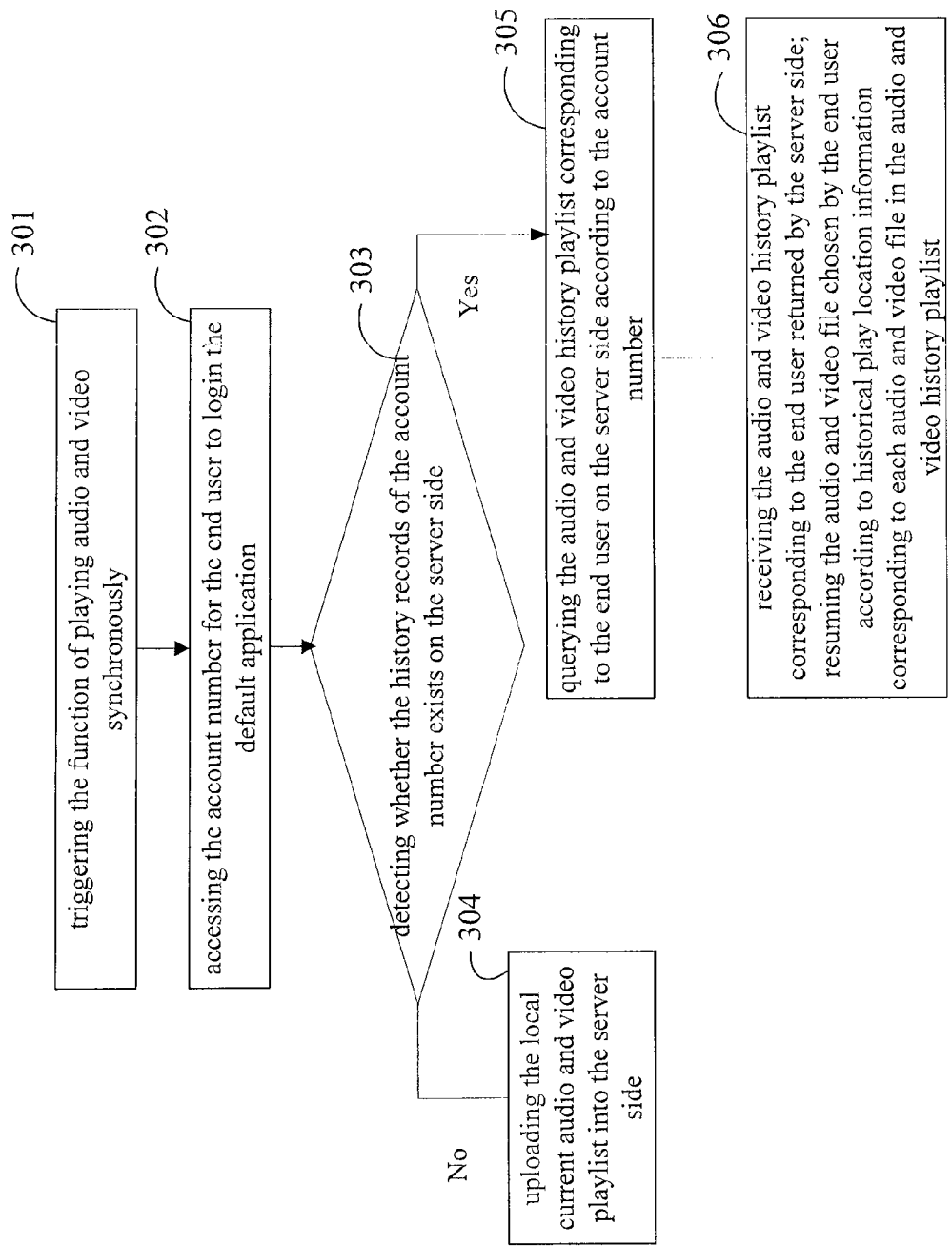
FIG. 3 is a flow diagram of the method for playing audio or video synchronously with the account number exists on the sever.

The embodiments of the present disclosure provide a method for playing audio or video synchronously, the preset ID of the present embodiment will be described by taking the account number for the end user to login the default application as example. As shown in FIG. 3, the process of the method comprises:

301: triggering the function of playing audio or video synchronously.

This step is similar to step 201, which need not be repeated in this step.

302: accessing the account number for the end user to login the default application.

In this step, the audio or video playlist is synchronized according to the account number for the end user to login the default application. Preferably, accessing the account number for the end user to login the default application, this step comprises: receiving the account number entered by the user or reading the account number logged in by the user. In this embodiment, if the user hasn't logged in the default application, then pop up login interface when the user triggers the synchronous function; when the user has logged in the default application, then read the account number of the user for the default application; how to access the account number in the specific execution process shall not be specifically limited by the embodiment.

303: detecting whether the history records of the account number exists on the server side, if yes, then execute step 305; if no, then execute step 304.

Preferably in this embodiment, the method of execution of detecting whether the account number exists on the server side is similar to the method of detecting whether IMEI No. exists on the server side in step 203, which need not be repeated in the embodiment.

It is worthy of note that in the specific execution process, step 303 is optional, step 305 can be directly executed without detecting the account number for the user to login the default application, which shall not be specifically limited by the embodiment.

304: uploading the local current audio or video playlist into the server side.

This step is similar to step 204 in embodiment 2, which need not be repeated in the embodiment.

305: querying the audio or video history playlist corresponding to the end user on the server side according to the account number.

This step is similar to the method of querying the audio or video history playlist corresponding to the end user on the server side according to the IMEI No. in step 305, which need not be repeated in the embodiment.

306: receiving the audio or video history playlist corresponding to the end user returned by the server side; resuming the audio or video file chosen by the end user according to historical play location information corresponding to each audio or video file in the audio or video history playlist.

This step is similar to step 206 in embodiment 2, which need not be repeated in the embodiment.

It is worthy of note that if step 303 is not executed in this embodiment, then execute step 305 directly; and if the audio or video history playlist of the end user returned by the server side is not received, it indicates that the account number is not recorded on the server side, then execute step 304, which need not to be repeated here.

It is worthy of note that after the terminal function of playing audio or video synchronously is initiated in this embodiment, and after users modify the local audio or video playlist, e.g. execute delete, add or edit operations on the local audio or video playlist, then synchronize the modified audio or video playlist into the server side. Optionally, long connection between the server side and the terminal may also be created, e.g. a long connection between the server and the terminal may be created through Heartbeat Packet mechanism or PUSH mechanism, so that the updated part will be automatically synchronized to the local when the audio or video playlist on the server side updates.

So optionally, after synchronizing the local current audio or video playlist according to the audio or video history playlist corresponding to the end user, the step also comprises: determining whether the local current audio or video playlist includes the modification operations on each audio or video file, if yes, synchronize the modification operations into the audio or video playlist corresponding to the server side.

Optionally, after synchronizing the local current audio or video playlist according to the audio or video history playlist corresponding to the end user, the step also comprises: receiving the synchronous update command sent by the server side which includes variation of the audio or video playlist corresponding to the server side; updating the local current audio or video playlist according to the synchronous update command.

It is worthy of note that if the user has logged in the default application, then the local audio or video playlist before the login can be recovered when the user exited the default application, and the synchronized playlist is hidden after login, which shall not be specifically limited by the embodiment.

The beneficial effects of the present embodiment comprises: triggering the function of playing audio or video synchronously, and accessing the preset ID corresponding to the end user; querying the audio or video history playlist corresponding to the end user on the server side according to the preset ID, wherein the audio or video history playlist includes the link address and historical play location of the historical audio or video file; resuming the audio or video file chosen by the end user according to historical play location information corresponding to each audio or video file in the audio or video history playlist. The problem of resuming the audio or video from the breakpoint across terminals can be solved by adopting the technical scheme in the present embodiment which is described as follow: storing the user's audio or video history playlist corresponding to the account for the user to login the default application on the server side, and accessing the audio or video history playlist which belongs to the user corresponding to the account according to the account, then the user can choose the video file to resume in the audio or video history playlist.

Figure 4A:
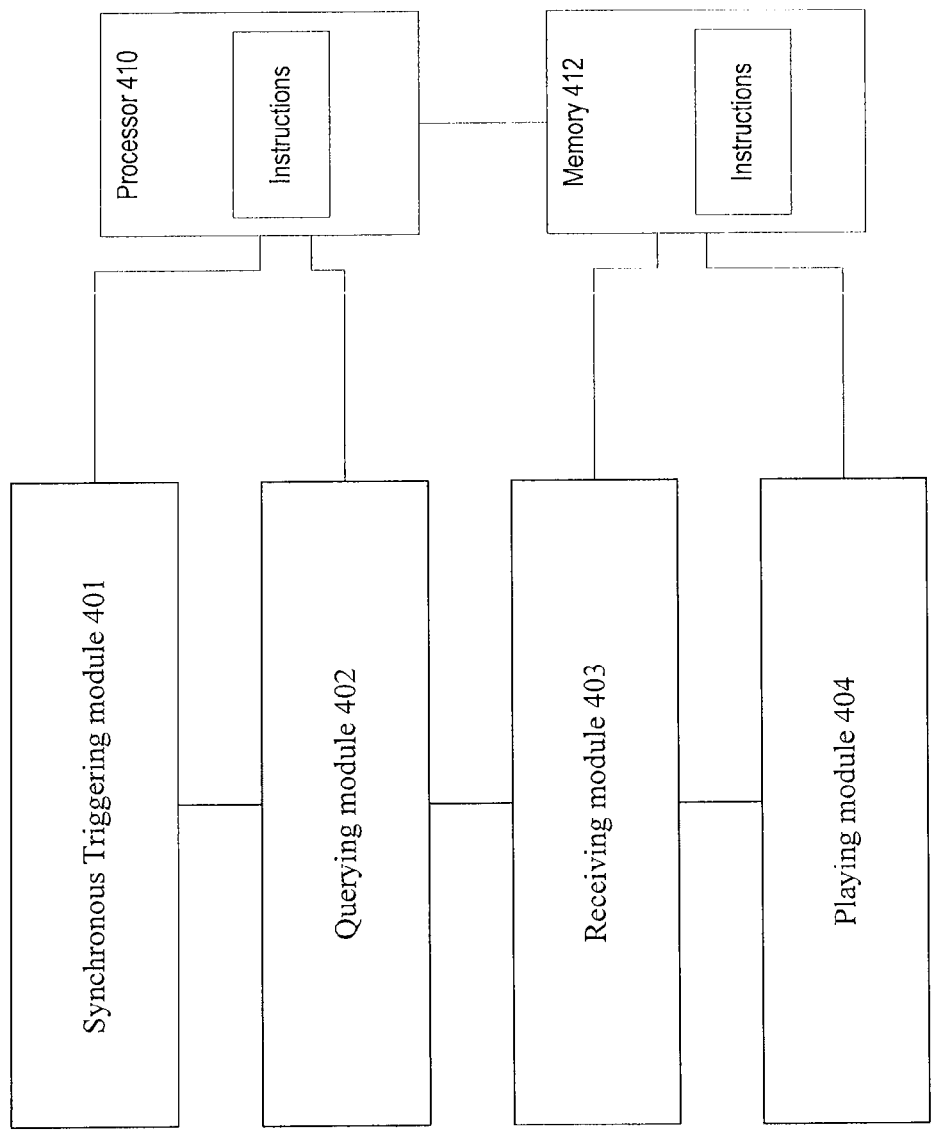
FIG. 4a is a structure schematic diagram of the apparatus for playing audio or video.

As shown in FIG. 4a, the embodiment of the present disclosure provides an apparatus for playing audio or video synchronously, which includes Synchronous Triggering module 401, Querying module 402, Receiving module 403 and Playing module 404. All modules may be stored in memory 412 and may be executed by one or more processors 410.

Synchronous Triggering module 401 is configured to trigger a function of playing media synchronously and acquiring a preset ID corresponding to an end user;

Querying module 402 is configured to obtain an media history playlist corresponding to the end user according to the preset ID, wherein the media history playlist comprises a history of an address and a play location of an media file that is listened or viewed by the end user.

Receiving module 403 is configured to receive the media history playlist according to the end user from a server;

Playing module 404 is configured to resume the audio or video file chosen by the end user according to historical play location information corresponding to each audio or video file in the audio or video history playlist.

The playing module 404 is also configured to resume the media file that is chosen by the end user according to the media history playlist.

Figure 4B:
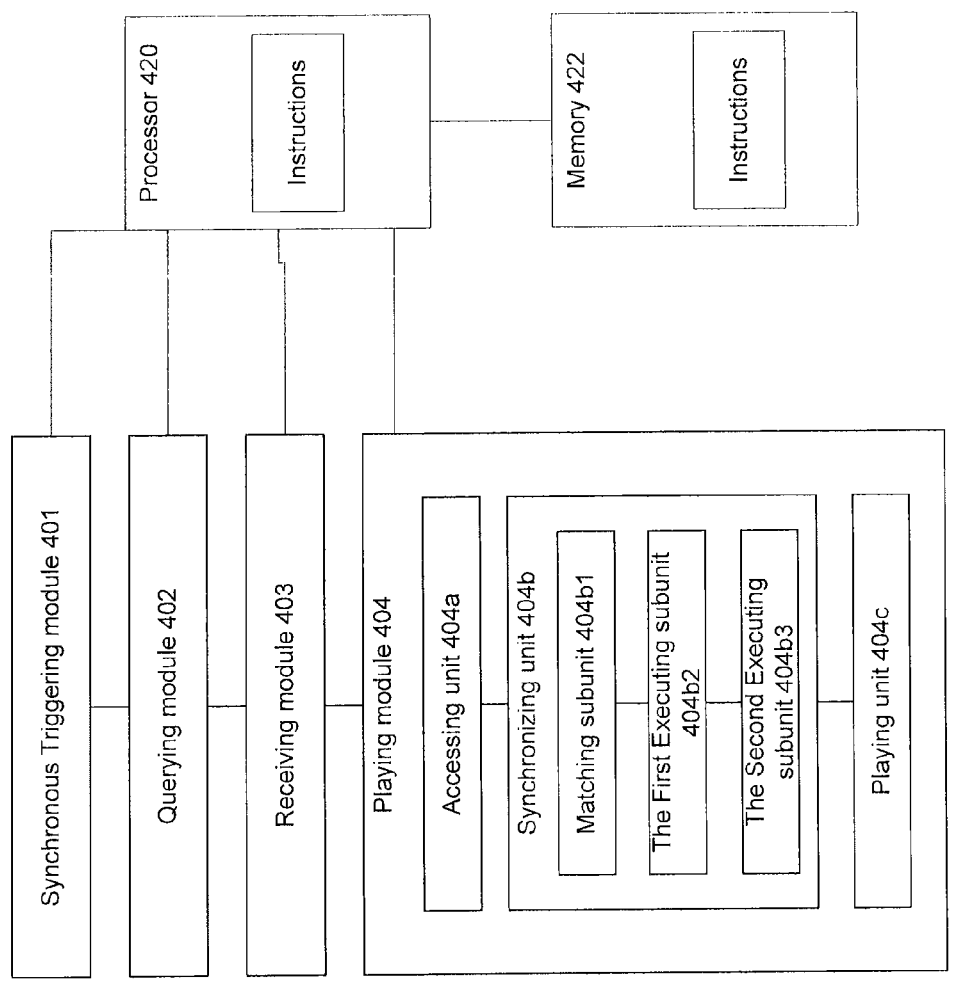
FIG. 4b is another structure schematic diagram of the apparatus for playing audio or video synchronously.

As shown in FIG. 4b, the Playing module 404 comprises:

Accessing unit 404a is configured to access a local current media playlist;

Synchronizing unit 404b is configured to synchronize the local current media playlist according to the media history playlist corresponding to the end user from the server;

Playing unit 404c is configured to resume the audio or video file chosen by the end user according to historical play location information corresponding to each audio or video file in the synchronized audio or video playlist.

As shown in FIG. 4b, the Synchronizing unit 404b comprises:

Matching subunit 404b1 is configured to match the local current media playlist with the media history playlist corresponding to the end user from the server;

The First Executing subunit 404b2 is configured to merge the media file according to the local current media playlist when the media history playlist corresponding to the end user from the server does not match the local current media playlist;

The Second Executing subunit 404b3 is configured to merge the local current media playlist with the media history playlist when the local current media playlist does not match the media history playlist corresponding to the end user from the server, and uploading the merged media history playlist to the server wherein the server stores the merged media history playlist corresponding to the preset ID.

The Accessing unit 404a is also configured to receive a command for saving playing information for the audio and video file wherein the play information includes the address and the play location of the of the media file, and save the play information to the media history playlist.

In another embodiment, the Synchronizing unit 404b is also configured to determine whether the local current media playlist comprises a modification operation for the media file, and synchronize the modification operation to the media history playlist in the server if the local current media playlist comprises the modification operation.

The Synchronizing unit 404b is also configured to receive a synchronous update command from the server wherein the synchronous update command comprises an amount of change to the media history playlist in the server, and update the local current media playlist according to the synchronous update command.

In another embodiment, the Querying module 402 is also configured to detect whether a history record of the preset ID exists on the server; if the history record of the preset ID exists, query the media history playlist corresponding to the end user in the server according to the preset ID; if the history record of the preset ID does not exist, upload the local current media playlist into the server.

The media history playlist may include at least one of a name and a thumbnail of the media file.

The audio or video history playlist also includes the name and/or thumbnail of the historical audio or video file.

The preset ID includes but not limited to IMEI No. of the terminal or the account number for the end user to login the default application.

The beneficial effects of the present embodiment comprises: triggering the function of playing audio or video synchronously, and accessing the preset ID corresponding to the end user; querying the audio or video history playlist corresponding to the end user on the server side according to the preset ID, wherein the audio or video history playlist includes the link address and historical play location of the historical audio or video file; resuming the audio or video file chosen by the end user according to historical play location information corresponding to each audio or video file in the audio or video history playlist.

The problem of resuming the audio or video from the breakpoint across terminals can be solved by adopting the technical scheme in the present embodiment which is described as follow: storing the user's audio or video history playlist corresponding to the preset ID on the server side, and accessing the audio or video history playlist which belongs to the user corresponding to the preset ID according to the preset ID, then the user can choose the video file to resume in the audio or video history playlist.

It is important to note that the apparatus for playing audio or video synchronously provided by the above-mentioned embodiment only gives examples for the division of the above respective function module, while in the actual application, the above functions can be assigned to different modules to complete as required, i.e. dividing the internal structure of the apparatus into different function modules to complete all or part of functions described above.

Additionally, the apparatus such as terminal device for playing media such as audio or video synchronously provided by the abovementioned embodiment and the method embodiment of playing media such as audio or video synchronously come from the same conception. For the details of the specific realization process, please see the method embodiment, which need not be repeated here.

The serial number for the embodiment of the present disclosure is used for description only, it doesn't mean the merits of the embodiment.

A person with ordinary skill in the art can understand that the realization of all or part of procedures can be achieved via hardware or related hardware instructed by programs which may store in any non-transitory computer readable storage medium that may be a read-only memory, a disk or a CD-ROM etc.

Disclosed above are merely some examples of preferred embodiments of the present disclosure and these preferred embodiments are not intended to be limiting the scope of the present disclosure, hence any variations, modifications or replacements made without departing from the spirit of the present disclosure shall fall within the protective scope of the present disclosure.

I claim:

1. A method for playing media, the method comprising:
triggering, by a user terminal device having at least one processor, a function for playing one or more media files on the user terminal device;
acquiring, by the user terminal device, a preset identification (ID) corresponding to an end user;
detecting, by the user terminal device, whether a media play history record corresponding to the preset ID exists on a server;
obtaining from the server, by the user terminal device, a server media history playlist that corresponds to the end user according to the preset ID when a media play history record corresponding to the preset ID is detected on the server, wherein the server media history playlist comprises a history record comprising an address and a play location for the one or more media files played by the end user;
accessing by the user terminal device a local current media history playlist; synchronizing, by the user terminal device, the local current media history playlist and the server media history playlist that comprises the media play history record corresponding to the end user, the synchronization including:
merging any different media history information from the server media history playlist into the local current media history playlist to update the local media history playlist when the server media history playlist has some different information than the local current media history playlist; and
merging any different media history information from the local current media history playlist into the server media history playlist to update the server media history playlist when the local current media history playlist has some different information than the server media history playlist;
and resuming, by the user terminal device, playing of a media file that is chosen by the end user according to the merged local current media history playlist.

2. The method according to claim 1, wherein the synchronizing further comprises:
matching, by the user terminal device, the local current media history playlist with the server media history playlist corresponding to the end user;
merging, by the user terminal device, the different media play history information into the server media history playlist corresponding to the end user according to the local current media history playlist when the server media history playlist corresponding to the end user does not match the local current media history playlist; or
merging, by the user terminal device, the different media history information into the local current media history playlist according to the server media history playlist corresponding to the end user when the local current media history playlist does not match the server media history playlist corresponding to the end user; and
uploading, by the user terminal device, the merged server media history playlist to the server wherein the server stores the merged media history playlist corresponding to the preset ID.

3. The method according to claim 1, further comprising:
receiving by the user terminal device, a command for saving play history information for a media file wherein the play history information includes an address and a play location of the media file; and
saving, by the user terminal device, the play information to the local current media history playlist.

4. The method according to claim 1, further comprising:
determining, by the user terminal device, whether the local current media history playlist comprises a modification operation for the media file; and
synchronizing, by the user terminal device, the modification operation to the media history playlist in the server when the local current media history playlist comprises the modification operation.

5. The method according to claim 1, further comprising:
receiving, by the user terminal device, a synchronous update command from the server wherein the synchronous update command comprises an amount of change made to a media history playlist in the server; and
updating, by the user terminal device, the local current media history playlist according to the synchronous update command.

6. The method according to claim 1, further comprising:
after detecting, by the user terminal device, whether a media play history record corresponding to the preset ID exists on the server, uploading, by the user device, the local current media history playlist into the server in instances when the media play history record corresponding to the preset ID does not exist on the server.

7. The method according to claim 1, wherein the local current media history playlist comprises at least one of a name and a thumbnail of the media file.

8. The method according to claim 1, wherein the preset ID comprises an International Mobile Station Equipment Identity (IMEI) number of a terminal or an account number for the end user to login a default application.

9. A terminal device for playing media, comprising:
one or more processors;
a memory;
a synchronous play triggering module stored in the memory and executed by the one or more processors, which causes the one or more processors to:
trigger a function that plays one or more media files and acquires a preset ID corresponding to an end user;
a querying module stored in the memory and executed by the one or more processors, which cause the one or more processors to:
detect whether a media play history record that corresponds to the preset ID exists on a server;
obtain from the server a server media history playlist that corresponds to the end user according to the preset ID when a media play history record corresponding to the preset ID is detected on the server, wherein the server media history playlist comprises a history record comprising an address and a play location for the one or more media files played for the end user;
access by the terminal device a local current media history playlist; and
synchronize the local current media history playlist and the server media history playlist that comprises the media play history record corresponding to the end user, the synchronization including:
  merging any different media history information from the server media history playlist into the local current media history playlist to update the local media history playlist when the server media history playlist has some different information than the local current media history playlist; and
  merging any different media history information from the local media history playlist into the server media history playlist to update the server media history playlist when the local current media history playlist has some different information than the server media history playlist; and
a media file playing module stored in the memory and executed by the one or more processors, which causes the one or more processors to resume playing a media file that is chosen by the end user according to the merged local media history playlist.

10. The terminal device according to claim 9, further comprising:
  a receiving module stored in the memory and executed by the one or more server media history playlist according to the end user from the server; and
  wherein the media file playing module comprises:
    an accessing unit stored in the memory and executed by the one or more processors, which causes the one or more processors to access the local current media history playlist; and
    a synchronizing unit stored in the memory and executed by the one or more processors, which causes the one or more processors to synchronize the local current media history playlist according to the media history playlist corresponding to the end user from the server.

11. The terminal device according to claim 10, wherein the synchronizing unit further comprises:
  a matching subunit stored in the memory and executed by the one or more processors, which causes the one or more processors to match the local current media history playlist with the server media history playlist corresponding to the end user;
  an executing subunit stored in the memory and executed by the one or more processors, which causes the one or more processors to merge the different media history information into the server media history playlist corresponding to the end user according to the local current media history playlist when the server media history playlist corresponding to the end user does not match the local current media history playlist;
  a second executing subunit stored in the memory and executed by the one or more processors, which causes the one or more processors to merge the local current media history playlist with the server media history playlist when the local current media history playlist does not match the server media history playlist corresponding to the end user, and
  upload the merged server media history playlist to the server wherein the server stores the merged server media history playlist corresponding to the preset ID.

12. The terminal device according to claim 10, wherein the synchronizing unit determines whether the local current media history playlist comprises a modification operation for the media file, and synchronizes the modification operation to the media history playlist in the server when the local current media history playlist comprises the modification operation.

13. The terminal device according to claim 10, wherein the synchronizing unit receives a synchronous update command from the server wherein the synchronous update command comprises an amount of change made to a media history playlist in the server, and update the local current media history playlist according to the synchronous update command.

14. The terminal device according to claim 9, wherein
  the playing module receives a command for saving play information for a media file wherein the play history information includes an address and a play location of the of the media file, and save the play information to the local current media history playlist.

15. The terminal device according to claim 9, wherein after the querying module detects whether a media play history record that corresponds to the preset ID exists on a server, the querying module:
  uploads the local current media playlist into the server in instances when the media play history record of the preset ID does not exist on the server.

16. The terminal device according to claim 9, wherein the local current media history playlist comprises at least one of a name and a thumbnail of the media file.

17. The terminal device according to claim 9, wherein the preset ID comprises an International Mobile Station Equipment Identity (IMEI) number of the terminal device or an account number for the end user to login a default application.

* * * * *